Nov. 13, 1951               H. C. FLACKE               2,575,211
ARRANGEMENT OF TRUNK LOCK AND LICENSE
PLATE ON MOTOR VEHICLES
Filed Aug. 3, 1948
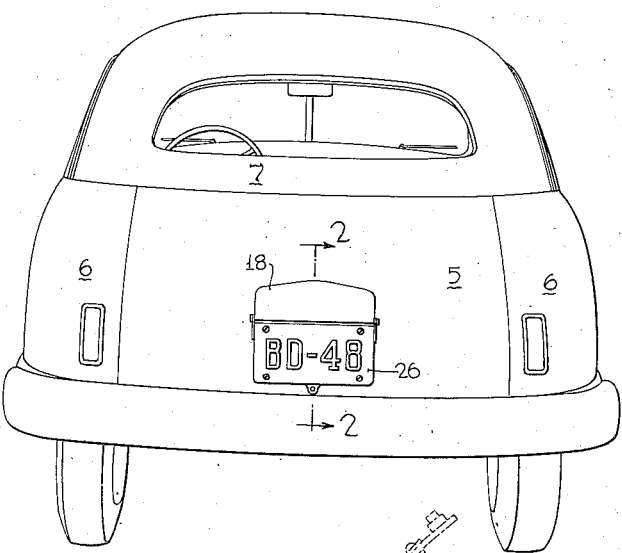
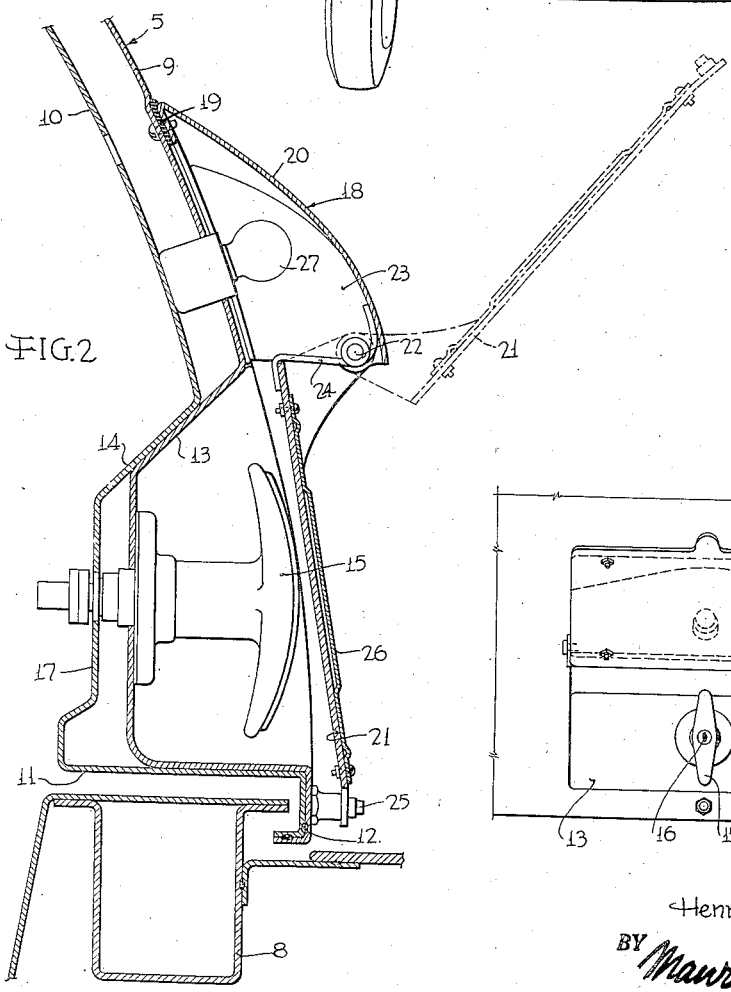
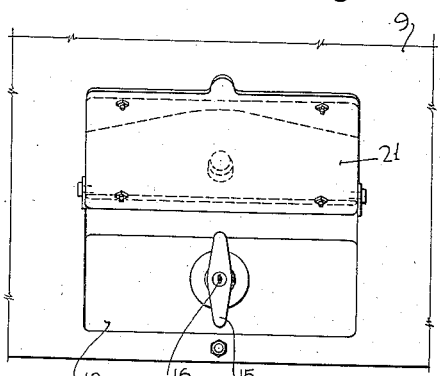
INVENTOR.
Henry C. Flacke
BY *Maurice A. Crews*
ATTORNEY Patented Nov. 13, 1951

2,575,211

UNITED STATES PATENT OFFICE 2,575,211

ARRANGEMENT OF TRUNK LOCK AND LICENSE PLATE ON MOTOR VEHICLES

Henry C. Flacke, Detroit, Mich., assignor to The Budd Company, Philadelphia, Pa., a corporation of Pennsylvania Application August 3, 1948, Serial No. 42,208

4 Claims. (Cl. 296—1)

The invention relates to an arrangement of lock and license plate on a lid forming part of the outer wall of a motor vehicle.

The invention achieves protection of the lock against damage, dirt and water, a smooth, streamlined exterior of the body, and a simple, easily manufactured construction by arranging the actuating part of the lock in a compartment formed on the lid which is closed by a removably supported license plate or a holder therefor.

An embodiment of the invention as applied to a trunk lid at the rear of a passenger automobile, is illustrated in the attached drawing, in which:

Figure 1 is a diagrammatic rear elevation of an automobile;

Figure 2 is a fragmentary section along line 2—2 of Figure 1, on a larger scale; and Figure 3 is a fragmentary elevation, on a somewhat larger scale, of the body shown in Figure 1 in the region of lock and license plate, showing the latter in raised position.

In the illustrated embodiment, the invention is applied to the trunk lid 5 at the rear end of a passenger automobile. It is, however, applicable to lids forming part of the motor compartment or being arranged in other regions of a body, for instance, at the front end thereof.

The lid 5 constitutes the outer surface of an automobile body and closes an opening defined by the rear quarter panels 6, the rearwardly sloping marginal portion 7 of the roof and a transverse underframe member 8. As customary, this lid 5 comprises an outer panel 9 and an inner structure or panel 10, the latter secured by marginal frame-forming flanges 11 to the margin of the outer panel 9 in the region of an overlap 12.

An outwardly open recess or compartment 13 is formed by a depression of the outer panel 9 near the middle of the car and close to the lower margin of the lid 5. The inner panel is correspondingly recessed at 14. The walls of the two recesses 13, 14 may overlap each other in part and may be secured together in the overlapping regions, preferably by electric spot welding.

The actuating means of a lock (not shown) for holding the lid 5 in closed position, which in the illustrated embodiment comprise a handle 15 and a key operated mechanism 16, is arranged in the recess 13. The lock mechanism proper is preferably secured to the inside of the lid at 17 and may be of any customary design.

A housing 18 is secured along its top and side margins at 19 to the outer surface of panel 9 above the recess 13 and is formed so that its transverse wall 20 is streamlined into the adjoining surface of panel 9 and so that it is open along its underside.

A plate 21 is secured swingably about a horizontal transverse axis at 22 to the side walls 23 of the housing 18. A spring 24 tends to hold plate 21 in the open, raised position shown in dot-and-dash lines in Figure 2 and in full lines in Figure 3. Normally, the plate 21 closes the recess 13 and covers the actuating means 15 by being held in downwardly extending position against the action of spring 24 by a snap lock or the like 25. The latter has its cooperating parts provided on the lower margins of the plate 21 and lid 5 respectively. Plate 21 constitutes a support for the license plate 26 which is illuminated by a bulb 27 arranged in the interior of the housing 18.

The invention is susceptible to adaptations and to modifications of different vehicle designs. For instance, the form and construction of the housing may be changed to suit the arrangement and construction of the lock actuating means. The spring biasing license plate holder 21 may be omitted or may be substituted by other means, such as ratchets holding the plate in the upright position, or by a spring holding the plate in the open or the closed position upon surpassing an intermediate position. The license plate itself may constitute part of the lid closure or the like covering the receptable for the lock actuating means, and the license plate holder and the lamp illuminating the license plate may be secured to a margin of the recess other than the upper margin.

While specific protection is sought for the preferred embodiment of the invention illustrated in the drawing and described hereinbefore, protection is sought also for the broader aspects of the invention, as explained by reference to some possible alterations and adaptations.

What is claimed is:

1. In a cover forming part of the outer walls of a motor vehicle and carrying a lock for releasably securing the cover to adjoining parts of the vehicle structure, the arrangement of manual actuating means for the lock in a compartment provided on the cover and formed at least in part by a license plate carrier, means movably connecting said carrier to the cover, said compartment enclosing and hiding from view said actuating means in one position and exposing to the outside of the vehicle said actuating means in another position of said carrier and a license plate thereon.

2. In a trunk lid for an automobile body, an outer panel constituting part of the outer body surface, an outwardly open recess formed in said panel at the location of a lock for the lid and adapted for receiving manual actuating means for the lock, a lamp housing secured to said lid along one margin of said recess, and a support for a license plate hinged to said housing so that a license plate on said support closes the recess but is removable from the opening of the recess for giving access to the lock actuating means.

3. Trunk lid for automobile bodies, comprising an outer panel, an outwardly open compartment on said panel for receiving actuating means for a lock, a lamp housing secured to the outside of said panel along a margin of said compartment, a support for a license plate hinged to said housing and provided with means releasably holding it to the lid in a position closing said compartment while permitting the support with a license plate to be moved into another position giving access to actuating means in the compartment.

4. Trunk lid according to claim 3, comprising a spring engaging said support and said lid and biased for holding said support in the position giving access to the compartment.

HENRY C. FLACKE.

REFERENCES CITED

The following references are of record in the file of this patent:

UNITED STATES PATENTS

| Number | Name | Date |
| --- | --- | --- |
| 2,035,895 | Kelley | Mar. 31, 1936 |
| 2,104,539 | Hacker | Jan. 4, 1938 |
| 2,128,679 | Kielian | Aug. 30, 1938 |
| 2,241,647 | Simon | May 13, 1941 |
| 2,314,326 | Cadwallader | Mar. 23, 1943 |

FOREIGN PATENTS

| Number | Country | Date |
| --- | --- | --- |
| 495,603 | Great Britain | Nov. 16, 1938 |